United States Patent [19]

Smith et al.

[11] 4,256,130
[45] Mar. 17, 1981

[54] PNEUMATIC VALVE CONTROL FOR TEXTILE MACHINERY BLOWDOWN

[75] Inventors: James B. Smith; Craig B. Whitney, both of Charlotte, N.C.

[73] Assignee: Pneumafil Corporation, Charlotte, N.C.

[21] Appl. No.: 936,573

[22] Filed: Aug. 22, 1978

[51] Int. Cl.³ .............................................. E03B 1/00
[52] U.S. Cl. ....................................... 137/1; 137/102; 19/107; 251/5
[58] Field of Search ....................... 251/5; 137/102, 1; 19/107; 15/301, 345

[56] References Cited

U.S. PATENT DOCUMENTS

| | | | |
|---|---|---|---|
| 212,972 | 3/1879 | Osgood | 137/102 |
| 2,252,418 | 8/1941 | Shelley | 137/102 |
| 2,582,546 | 1/1952 | Klein | 137/102 X |
| 2,706,487 | 4/1955 | Wilson | 137/102 |
| 3,150,415 | 9/1964 | Reiterer | 19/107 |
| 3,918,674 | 11/1975 | Sutter | 251/5 |
| 4,041,970 | 8/1977 | Peters | 137/102 |

*Primary Examiner*—Harold W. Weakley
*Attorney, Agent, or Firm*—Robert W. Fiddler

[57] ABSTRACT

A control valve arrangement implementing the use of pneumatic valves to control air flow for textile machinery blowdown, and the remote control of such pneumatic valves by means of remotely located solenoid valves. In air flow systems employing pneumatic valves of the type having a constrictable flexible annulus arranged within a rigid conduit with air under pressure selectively admissible to a space between the annulus and the surrounding conduit wall so as to effect constriction of the annulus to close off the passage through the conduit, solenoid actuated control valves have conventionally been employed to control the flow of fluid to said space between annulus and conduit to effect annulus constriction. Where these solenoid actuated control valves are located at control points which are remote from the pneumatic valve, it is found that the release of the annulus constricting air pressure is delayed due to the time delay between solenoid actuation and pressure change at the remote pneumatic valve. To eliminate this problem, a quick exhaust valve is arranged in proximity to the conduit in a line between the solenoid actuated control valve and the pneumatic valve, so that immediately upon release of pressure at the control valve, the annulus constricting air pressure is quickly released and the annulus will distend to permit flow through the duct in which the annulus is positioned.

6 Claims, 2 Drawing Figures

PNEUMATIC VALVE CONTROL FOR TEXTILE MACHINERY BLOWDOWN

BACKGROUND OF THE INVENTION

This invention relates to the art of pneumatic valves and more particularly to means implementing the use of pneumatic valves to control air flow for textile machinery blowdown and the remote control of a pneumatic valve of the type in which a flexible annulus is arranged within a conduit with a fluid containing space between the side walls of the conduit and the annulus such that upon a build-up of fluid pressure in this space, the flexible annulus will become constricted to prevent flow through the conduit. A variety of controls have been evolved for controlling and regulating the flow of valve actuating fluid to the space between the annulus and the relative rigid conduit sidewall of these pneumatic valves. However, where the control valves are remotely located as they usually are in any industrial situation, such for example, as in a textile mill where a variety of pneumatic cleaning and waste collection systems may be employed, a central control panel is generally installed to effect control of the pneumatic system. Vented solenoid actuated valves at the central control station are generally employed to control the flow of control fluid (generally air) to the remotely located pneumatic valve to effect constriction of the flexible annulus in the pneumatic valve.

When it is desired to open the pneumatic valve, the centrally positioned vented control valve is actuated to cut off the flow of the annulus constricting fluid permitting the annulus to distend to its normal position permitting flow to the duct work in connection with which the pneumatic valve is employed, with the control fluid in the system between the control valve and the pneumatic valve vented to ambience through the control valve.

Depending on the distance of the control valve from the pneumatic valve, it is found that the release of the constricting air which must flow back to the control valve often occurs significantly later than the time that the solenoid valve was initially activated to cut off the flow of pneumatic valve control air, thus producing an undesirable time delay between initiation and completion of the control action opening the pneumatic valve.

Where an attempt is made to avoid the time delay between control valve actuation and pneumatic valve response by arranging the control valve in proximity to the pneumatic valve and employing a remote switch at a central control panel to actuate the control valve, the wiring between the central control panel and the control switch increases installation, operation and maintenance costs.

SUMMARY OF THE INVENTION

It is with the above considerations in mind that the present improved pneumatic valve control has been evolved, permitting a pneumatic valve of the above described type utilizing a constrictable annulus to be controlled from a remote control point and permitting relatively rapid opening of the pneumatic valve.

It is accordingly among the primary objects of this invention to provide an improved control system for pneumatic valves.

Another object of the invention is to provide means implementing the use of a pneumatic valve to control air flow for textile machinery blowdown.

An additional object of the invention is to provide an improved control for undercard cleaning systems.

A further object of the invention is to provide improved means permitting rapid release of annulus constricting pressure in a pneumatic valve.

An additional object of the invention is to provide an improved method for operating a pneumatic valve from a remote point.

These and other objects of the invention which will become hereafter apparent are achieved by providing a pneumatic valve of the type in which a constrictable flexible annulus is arranged within a rigid walled valve conduit with a fluid inlet connection permitting a pressurized fluid (preferably air) to be admitted into the space between the constrictable flexible annulus and the valve conduit wall so that upon a build-up of pressure, the annulus will constrict to close off the flow path through the valve which is through the flexible annulus. The actuating air to effect operation of the pneumatic valve is generally provided by a remote pressure source such as an air compressor, blower, compressed air tank, or the like, via a pressure supply line leading from the pressure source to the control air inlet in the valve conduit. Regulation of the flow of control air to the pneumatic valve is generally effected by utilization of a solenoid actuated valve positioned at a control panel generally remote from the pneumatic valve to be controlled. When the solenoid actuated valve is opened to permit control air to pass to the pneumatic valve, the control air passes into the space between the annulus and the valve conduit sidewall, causing the elastic annulus to constrict to a point where the flow of air through the valve annulus is ultimately blocked. When it is desired to open the pneumatic valve, the pressure between the constrictable annulus and the valve conduit sidewalls must be relieved, and this is done by shutting the solenoid actuated control valve, stopping the flow of control air to the space between annulus and valve conduit sidewall, and releasing the annulus constricting air pressure. Utilizing solenoid actuated control valves the downstream side of the solenoid valve is vented through the valve when the valve is closed. In accordance with the invention, to eliminate the need for air flow back through the conduit from the pneumatic valve to the control valve for venting with resultant time delay in the opening of the pneumatic valve, a secondary quick exhaust valve is positioned in the control air line to vent the control air upon closure of the solenoid actuated control valve. Additionally, the speed of venting is increased by arrangement of an exhaust line from the exhaust valve through a tube leading to the suction side of the pneumatic valve.

The above described pneumatic valve arrangement is particularly suitable for use with an undercard blowdown system for a textile carding machine. To this end an air pilot line is extended between the pneumatic valve and a valve controlling flow of relatively high pressure air to the undercard blowdown ducts of the card.

A feature of the invention resides in the fact that the control of the pneumatic valve permits the valve to be arranged in a textile machine blowdown system so that the pneumatic valve opens to provide suction before blowdown begins and to insure cessation of blowdown before the pneumatic valve closes to cut off suction.

A further feature of the invention resides in the fact that by the utilization of a relatively inexpensive quick exhaust valve at the pneumatic valve, the opening and closing of the pneumatic valve may be effectively obtained from a remotely positioned solenoid control valve at a remote control center.

An additional feature of the invention resides in the utilization of an exhaust line extending between the annulus surrounding space and suction side of the pneumatic valve to improve the speed of opening of the pneumatic valve.

BRIEF DESCRIPTION OF THE DRAWINGS

The specific details of a preferred embodiment of the invention will be described in clear, concise, and exact terms in conjunction with the accompanying drawings, wherein.

DESCRIPTION OF PREFERRED EMBODIMENT

Referring now more particularly to the drawings like numerals in the various FIGS. will be employed to designate like parts.

Figure 1:
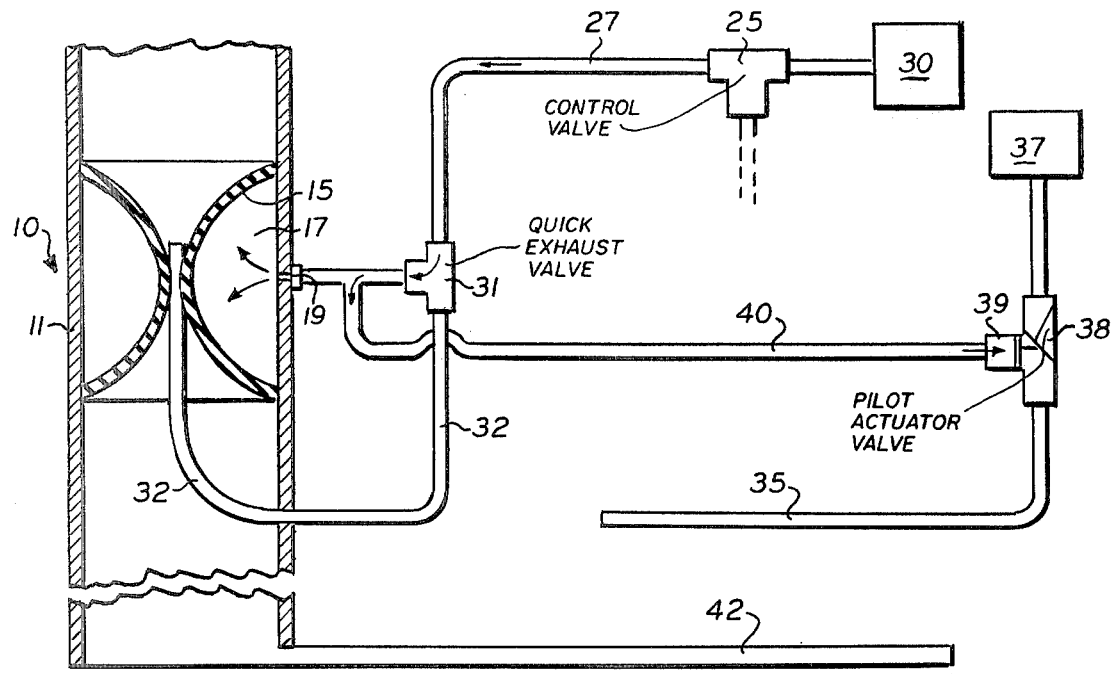
FIG. 1 is a schematic view of a pneumatic valve and a control system therefor, arranged in a textile machine blowdown system, showing the pneumatic valve in a closed position restricting flow through the conduit in connection with which the valve is employed.

As shown schematically in the drawings, the pneumatic valve 10 of a known construction, as shown in U.S. Pat. No. 3,918,674 of N. Sutter, comprises a relatively rigid exterior conduit 11 formed with a constrictable flexible interior annulus 15. A valve actuating space 17 is formed between the annulus 15 and the rigid conduit 11, as best seen in FIG. 1, and a control air inlet 19 is formed in the conduit 11 to permit the admission of control air to the valve actuating space 17, so that, as understood by those skilled in the art, upon the admission of air under pressure to the space between the annulus 15 and the relatively rigid conduit 11, the annulus will be constricted to close off any fluid flow through the valve.

As illustratively shown, pneumatic valve operation is regulated by means of control valve 25. Control valve 25 is preferably a normally open solenoid actuated downstream vented valve in which the vent opening is closed when the valve is in its normally open air passing position and opened when the valve is closed to vent any air in the system downstream of the valve. Valve E 2 SM - 3012 - 1612Z of Versa Products Co. of Englewood, N.J. is found suitable for valve 25 which is positioned in a control air supply line 27 extending from the control air inlet 19 to a pressure supply source, identified in the drawing by the block element labeled 30, but readily apparent to those skilled in the art, to indicate either an air compressor, compressed air tank, or other pressurized fluid supply source.

Arranged adjacent pneumatic valve 10 in the control air supply line 27 is a quick exhaust valve SQE-2 of Humphrey Products of Kalamazoo, Mich. This quick exhaust valve 31 is of a type which, under pressure of a given magnitude, provides an air flow path in the direction indicated by the arrow in FIG. 1, and upon a drop in pressure provides an air flow path in the direction shown in FIG. 2. Exhaust line 32 extends from the quick exhaust valve 31 to the suction side of pneumatic valve 10.

Where, as schematically illustrated, the pneumatic valve 10 is employed in connection with a textile machine blowdown system, such for example as an undercard cleaning system, the undercard blowdown line 35 connected to an appropriate air supply source 37 is provided with a pilot actuated valve 38, such as Humphrey Products' valve X621, having an actuating side 39 connected to pilot line 40. Valve 38 is normally open, except when acted upon by a pilot line pressure in excess of a given magnitude. The pilot line 40 extends from the actuating side 39 of valve 38 to a point on the supply line between quick exhaust valve 31 and the control air inlet 19 on pneumatic valve 10.

Figure 2:
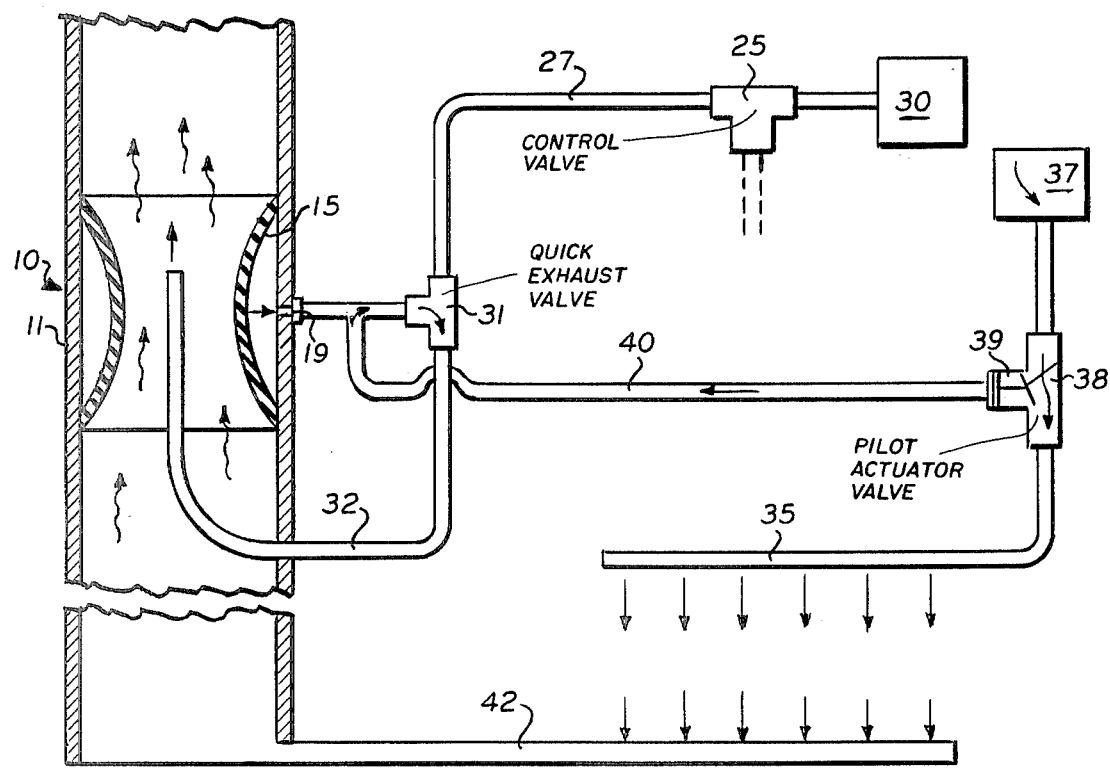
FIG. 2 is a schematic view similar to FIG. 1, illustrating the valve in open position.

Arranged at a spaced distance from blowdown line 35 is a suction line 42, as schematically shown in FIG. 2, coupled to the pneumatic valve line.

OPERATION

As is apparent to those skilled in the art, the above disclosed pneumatic control system finds particular utilization in those pneumatic installations where a central control panel is provided for controlling one or more pneumatic valves remotely located with respect to the control panel.

Thus, where pneumatic valves are employed in air handling systems in the card room of a textile mill where card cleaning equipment is provided with suction and blowing ducts positioned at various points on the card to keep the card clean and maintain efficiency of the card operation, such for example as equipment sold under the trademark PNEUMACARD, a central control panel may be arranged in the card room to control the desired operation of the pneumatic card cleaning equipment. With a control air supply line 27, which may readily run for 100 feet from a control panel to the pneumatic valve to be controlled, it is apparent to those skilled in the art, that where venting of the control air to release the constricting pressure on the pneumatic valve annulus 17 takes place at the control valve, there is a considerable time factor between the closing of the solenoid control valve and the desired release of pressure at the annulus.

In accordance with the invention, however, where a quick exhaust valve 31 is positioned in proximity to the pneumatic valve, the constricting pressure on the annulus is quickly relieved upon closure of the solenoid actuated control valve 25. Further, the facility of relief of this constricting air pressure is significantly implemented by virtue of the vacuum produced in exhaust line 32, as a result of its extension to the low pressure suction side of the pneumatic valve.

As illustratively shown, when the system is employed for undercard blowdown, the pneumatic valve annulus 15 is constricted, as shown in FIG. 1, by the action of the air pressure supplied by supply line 27. At this time, the air pressure in the supply line is transmitted through pilot line 40 to pilot actuated valve 38 to maintain same in the schematically illustrated closed position shown in FIG. 1.

When it is desired to blowdown the card, the control valve 25 is closed, shutting off the flow of air through the supply line 27. When the pressure drops, the quick exhaust valve 31 opens, quickly releasing pressure on the flexible valve annulus 15, permitting it to return to the FIG. 2 position. The speed of pressure reduction is further enhanced by the vacuum produced by the exhaust line 32 connection from the quick exhaust valve 31 to the suction side of the valve.

With the drop in pressure in the supply line 27, there is also a drop in pressure in pilot line 40, coupled in pressure transmitting relationship thereto. As a result of this pilot line pressure drop, pilot actuated valve 38 will open, as schematically shown in FIG. 2, permitting a flow of blowdown air to the blowdown line 35.

The suction line 42 by virtue of its connection to the pneumatic valve will have already been actuated. It will be noted that the inertia of the pilot valve mechanism produces the desirable result that suction begins before blowdown commences, and blowdown ceases before the valve cuts off suction to the undercard area.

The above disclosure has been given by way of illustration and elucidation, and not by way of limitation, and it is desired to protect all embodiments of the herein disclosed inventive concept within the scope of the appended claims.

What is claimed is:

1. An air handling system having means for controlling the operation of a pneumatic valve having a flexible constrictable annulus arranged within a conduit having walls relatively stiff with respect to the annulus, with a fluid containing valve actuating space between the walls of the conduit and the annulus, said means comprising: a fluid supply line extending from a fluid pressure source to the valve actuating space between the annulus and conduit wall; a control valve arranged in said supply line at a point relatively remote from the pneumatic valve to be controlled; and a quick exhaust valve located adjacent the pneumatic valve, said quick exhaust valve passing fluid under pressure to the valve actuating space when pressure in the supply line is above a given magnitude, and having an exhaust opening releasing pressure from the valve actuating space upon a drop in pressure in said supply line beneath said given magnitude, said pneumatic valve used in a textile machinery blowdown system having a blowdown line directing air to a selected location with respect to a textile machine, and a suction line spaced from said blowdown line to pick up material entrained in the air stream from the blowdown line; a pilot valve controlling air flow through the blowdown line; and a pilot line from said supply line to said pilot valve closing said pilot valve when air is fed to the actuating space and opening said pilot valve to permit the flow of blowdown air upon cessation of air flow to the valve actuating space.

2. An air handling system as in claim 1 in which an exhaust line extends from the exhaust opening of said quick exhaust valve to the interior of the pneumatic valve annulus in air transmitting relationship upon a drop in pressure in said supply line to release actuating space pressure through said quick exhaust valve.

3. An air handling system as in claim 1 in which said control valve comprises a downstream vented normally open solenoid operated valve.

4. An air handling system, as in claim 3, having a connection between said exhaust valve and the suction side of the pneumatic valve.

5. A method of operating a blowdown system for textile machinery having a blowdown line directing air to a selected location with respect to a textile machine, and a suction line spaced from said blowdown line, with a pneumatic valve having a flexible annulus in a rigid conduit with an actuating space between annulus and conduit, said valve in an air handling system coupled to the suction line, said method comprising the steps of supplying fluid under pressure to the valve actuating space; valving the flow of supplied fluid from a point relatively remote from the pneumatic valve to be controlled; and providing exhaust means adjacent the pneumatic valve for quickly releasing the fluid under pressure in the actuating space upon a drop in supply pressure beneath a given magnitude, and in which air flow through the blowdown line is valved; and the valving is controlled in response to the pressure in the pneumatic valve actuating space.

6. A method as in claim 5 in which a connection is made between said exhaust means and the flow path through the valve to increase the negative pressure on the actuating space when the fluid under pressure in the actuating space is released.

* * * * *